Nov. 12, 1968   G. L. DE PUNG ET AL   3,411,060
SAFETY DEVICE FOR A VEHICLE
Filed Dec. 16, 1965   2 Sheets-Sheet 1
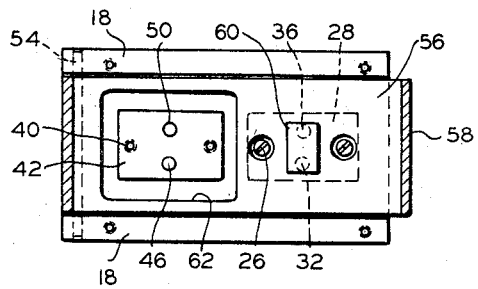
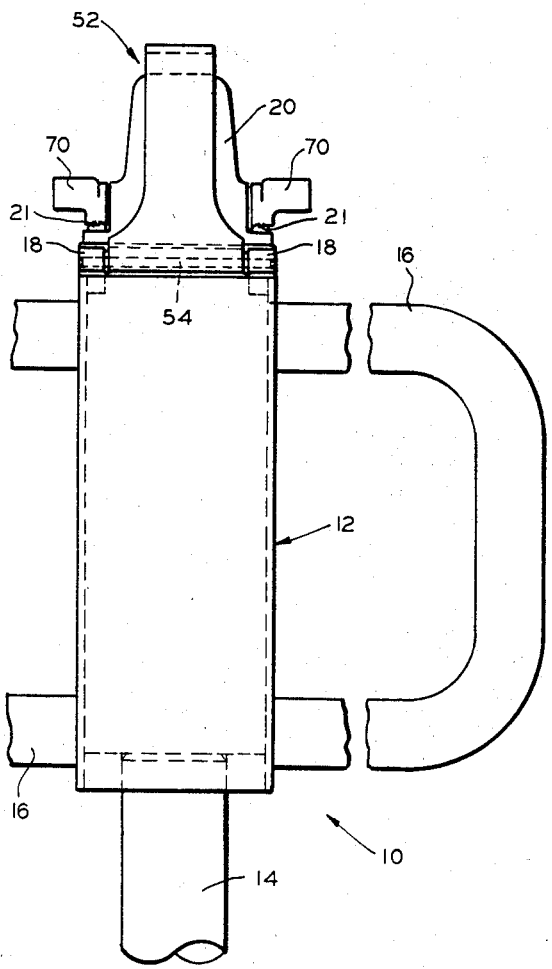
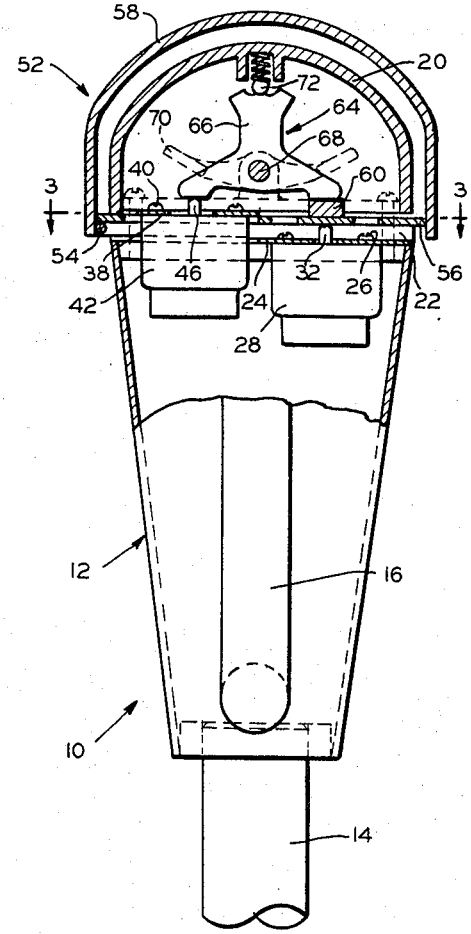
INVENTORS
GARY L. DEPUNG
LOUIS A. HADDOCK JR.
BY Robert H Johnson
ATTORNEY Nov. 12, 1968   G. L. DE PUNG ET AL   3,411,060
SAFETY DEVICE FOR A VEHICLE
Filed Dec. 16, 1965   2 Sheets-Sheet 2

INVENTORS
GARY L. DE PUNG
LOUIS A. HADDOCK JR.
BY Robert H Johnson
ATTORNEY

United States Patent Office 3,411,060
Patented Nov. 12, 1968

3,411,060
SAFETY DEVICE FOR A VEHICLE
Gary L. De Pung and Louis A. Haddock, Jr., Battle Creek, Mich., assignors to Clark Equipment Company, a corporation of Michigan
Filed Dec. 16, 1965, Ser. No. 514,202
3 Claims. (Cl. 318—283)

ABSTRACT OF THE DISCLOSURE

A safety device for vehicles operable to reverse the direction of a self-propelled industrial type hand truck when the control lever engages an object during forward movement of the truck.

---

Figure 4:
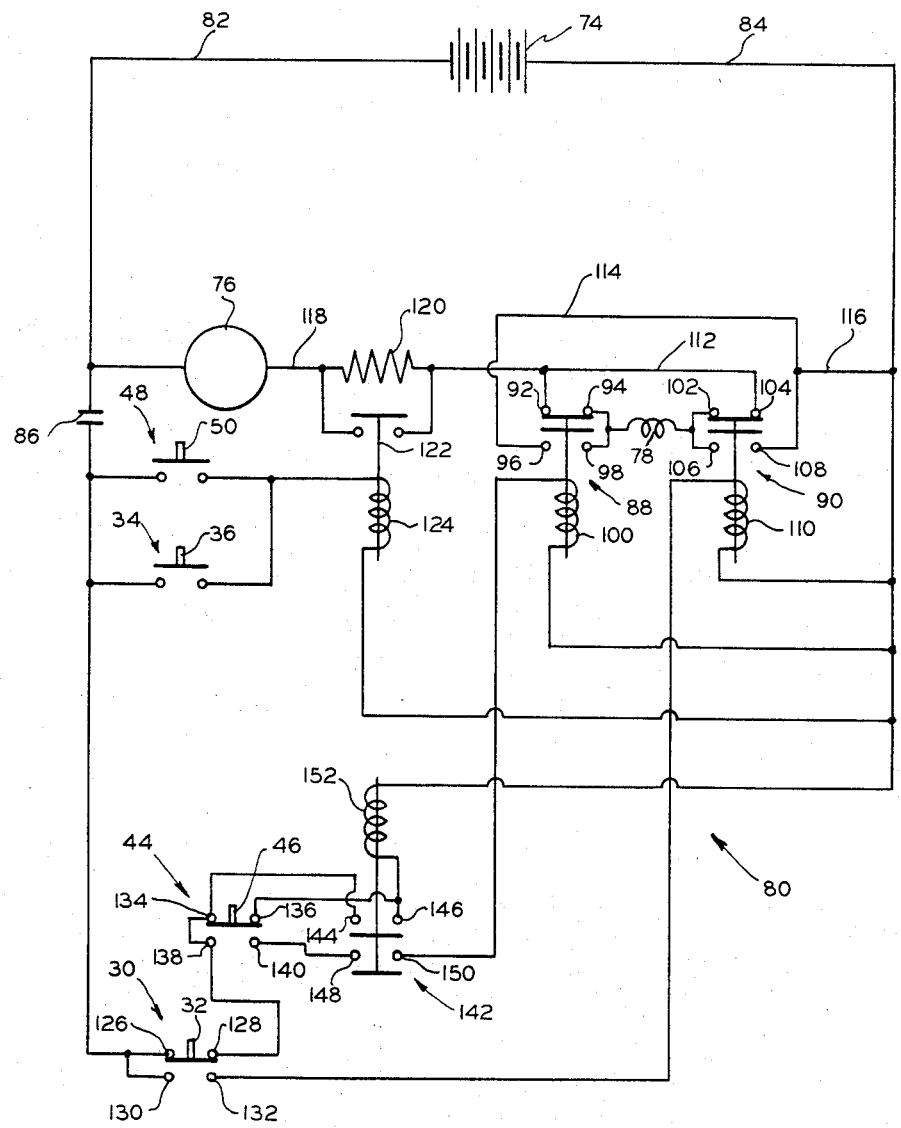

Electric battery powered pallet trucks and lift trucks for moving equipment and materials from one place to another are in rather general use today. One type of commonly used industrial truck requires that the operator steer the truck by manipulation of a control lever while walking adjacent the truck. The control lever also is provided with control switches for moving the truck under power in forward or reverse direction. Sometimes, for example, while maneuvering the vehicle in close quarters the operator may be positioned between the control lever and a wall or other similar object. In such case, if the vehicle is moving in a forward direction, the operator may become wedged between the wall and the control lever and, even though he may succeed in shutting off the power, be seriously or even fatally injured because the momentum of the vehicle may drive the control lever into his trapped body. Devices which are directed to solving this problem are shown in U.S. Patent Nos. 2,902,105 and 2,942,679. However, the devices disclosed by both of these patents utilize additional safety switches mounted in the control handle which are responsive to engagement with an object to reverse the direction of vehicle operation and otherwise increase the complexity of the motor control circuitry. It is a principal object of the present invention to provide a simplified safety reversing mechanism.

A further object of our invention is to provide a motor control circuit in which the reverse control switch also functions as the safety reversing switch.

In carrying out our invention in a preferred embodiment we provide a control lever having forward and reverse control switches mounted thereon and a manually operable actuator to selectively actuate either the forward control switch or the reverse control switch. A safety actuator is mounted on the control handle and is operable to actuate the reverse control switch only. The forward and reverse control switches are connected in circuit so that actuation of the reverse control switch connects the electric motor for reverse drive regardless of the actuation of the forward control switch. Further, the forward and reverse control switches are connected in circuit with a solenoid actuated normally open switch so that the motor can be connected for forward drive only when the forward and reverse control switches are initially in their non-actuated positions at the same time.

The above and other objects, features and advantages of our invention will become more readily apparent to persons skilled in the art when the following detailed description is taken in conjunction with the accompanying drawing wherein:

FIGURE 1 is a side elevation view, partially in section, of a control lever embodying our invention, FIGURE 2 is an end view of the control lever of FIG. 1, FIGURE 3 is a cross section taken along the line 3—3 of FIG. 1, and FIGURE 4 is a diagram of the electric control circuit.

Referring now to FIGS. 1, 2 and 3, the reference numeral 10 denotes generally a control lever including a body 12 mounted on a tubular extension 14 and a pair of generally U-shaped handles 16 connected to body 12.

Mounted on body 12 is a pair of spacers 18 and a cap 20 which are connected thereto by screws 21. At this point it will be noted that body 12, spacers 18 and cap 20 define a slot 22 which extends across one end of body 12 as is best seen in FIG. 1.

Connected to a plate 24 across one end of body 12 by means of any suitable fasteners such as screws 26 is a switch assembly 28 which includes a reverse control switch 30 (FIG. 4) having a depressible actuator button 32 extending upwardly into slot 22 and a high speed control switch 34 (FIG. 4) having a depressible actuator button 36 extending upwardly into slot 22. Connected by screws 40 to a pair of support plates 38 which extend across slot 22 is a switch assembly 42. Switch assembly 42 includes a forward control switch 44 (FIG. 4) having a depressible actuator button 46 which extends above slot 22 and a high speed control switch 48 (FIG. 4) having a depressible actuator button 50 which extends above slot 22.

A safety actuator 52 is mounted on body 12 for pivotal movement by means of a pin 54 which preferably is welded to actuator 52 and has the ends thereof journaled in aligned holes in spacers 18. Safety actuator 52 is generally D-shaped, as viewed in FIG. 1, and includes a plate 56 which is welded to a generally semi-circular strap that extends over cap 20. Also attached to plate 56 is a spacer block 60. As can be seen best from FIG. 3, it will be noted that plate 56 extends through slot 22 and includes an opening 62 therein through which switch 42 extends. At this point it will be evident that a force which pushes on strap 58 from any direction will cause safety actuator 52 to pivot in a clockwise direction, as viewed in FIG. 1, about pin 54, and thus depress simultaneously actuator buttons 32 and 36.

Pivotally carried by cap 20 is a manually operable motor speed and direction control actuator 64 which includes an inverted T-shaped member 66 fixed to a pin 68 which is rotatably journaled in cap 20, the ends of pin 68 extending outwardly of cap 20 and having actuator levers 70 fixed thereto. Actuator 64 normally is maintained in the position shown in FIG. 1 by means of a spring loaded ball detent 72 which engages member 66. In the position shown in FIG. 1 member 66 engages actuator buttons 46 and 50 and spacer block 60. An operator can manipulate actuator 64 by pushing on either of levers 70 to pivot actuator 64 in a clockwise direction, thereby depressing actuator buttons 32 and 36 simultaneously or in a counter-clockwise direction to depress simultaneously actuator buttons 46 and 50.

At this point it will be noted that with actuator 64 pivoted in a counter-clockwise direction, thereby depressing actuator buttons 46 and 50, that it is still possible to depress actuator buttons 32 and 36 merely by applying a force to safety actuator 52, causing it to pivot in a clockwise direction.

Referring to FIG. 4, there is shown a power source 74 which preferably is a battery, an electric motor including an armature 76 and a field winding 78 and electrical circuitry 80 for connecting motor 76, 78 to power source 74 to rotate in either a forward or reverse direction at a low or high speed.

Connected to opposite sides of battery 74 is a pair of conductors 82 and 84. Conductor 82 includes a normally open switch 86 which is closed whenever control lever 10 is inclined from a substantially vertical or horizontal position to a position within the operating range of lever 10.

Circuitry 80 includes a solenoid-actuated forward motor switch 88 and a solenoid-actuated reverse motor switch 90. Forward motor switch 88 includes a pair of normally closed contacts 92 and 94 and a pair or normally open contacts 96 and 98. These contacts are arranged so that when a solenoid coil 100 is energized the normally closed contacts are opened and the normally open contacts are closed. Similarly, reverse motor switch 90 includes a pair of normally closed contacts 102 and 104 and a pair of normally open contacts 106 and 108 which are arranged so that when a solenoid coil 110 is energized the normally closed contacts are opened and the normally open contacts are closed.

Field winding 78 is connected at one end to contacts 94 and 98 and at the other end to contacts 102 and 106. Also, contacts 92 and 104 are connected by a conductor 112 and contacts 96 and 108 are connected by a conductor 114. Conductor 114 is connected to conductor 84 by a conductor 116 and conductor 112 is connected to conductor 82 by conductor 118 which also connects in series a low-speed resistor 120 and armature 76.

Circuity 80 includes a high speed circuit which has a solenoid-actuated normally open switch 122 connected across resistor 120. Switch 122 is operable so that it closes when solenoid coil 124 is energized with the result that resistor 120 is by-passed and motor 76, 78 will tend to run at a higher speed. The high speed circuit also includes high speed switches 34 and 48 which are connected in parallel with each other to conductor 82 and connected in series to one end of coil 124 which is connected at the other end to conductor 84. Closing of switch 34 or 48, assuming switch 86 is closed, energizes coil 124 with the result that switch 122 is closed and resistor 120 is by-passed.

Referring back now to reverse control switch 30 and forward control switch 44, it will be seen from FIG. 4 that reverse control switch 30 includes a pair of normally closed contacts 126 and 128 and a pair of normally open contacts 130 and 132. Similarly, forward control switch 44 includes a pair of normally closed contacts 134 and 136 and a pair of normally open contacts 138 and 140.

A reverse circuit is included in circuitry 80 and includes normally open contacts 130 and 132 of reverse control switch 30 and solenoid coil 110, the contacts and coil being connected in series circuit between conductors 82 and 84. By actuating reverse control switch 30 to close contacts 130 and 132, coil 110 is energized with the result that switch 90 is actuated to connect field winding 78 in circuit so that current flows in one direction therethrough which causes motor 76, 78 to rotate in a reverse direction of rotation.

Circuitry 80 includes a solenoid-actuated sequence switch 142 which has a first pair of normally open contacts 144 and 146 and a second pair of normally open contacts 148 and 150. Switch 142 is operable so that when a solenoid coil 152 is energized the normally open pairs of contacts thereof are closed.

Also forming a part of circuitry 80 is a forward circuit which includes the normally closed contacts 126 and 128 of reverse control switch 30, the normally open contacts 138 and 140 of forward control switch 44, the second pair of normally open contacts 148 and 150 of sequence switch 142 and solenoid coil 100 all connected in series circuit, respectively, between conductors 82 and 84.

Solenoid coil 152 is connected at one end to conductor 84 and at the other end to contact 146 which also is connected to contact 136. In addition, contact 144 is connected to contact 134 which is connected to contact 138.

While actuator buttons 32 and 36 are depressed at the same time, reverse control switch 30 requires a shorter movement to close contacts 130 and 132 than is required to close switch 34. Thus, motor 76, 78 is engaged for low speed reverse drive when contacts 130 and 132 are closed and connected for high speed reverse drive when switch 34 subsequently closes. Similarly, forward control switch 44 requires a shorter movement to close contacts 138 and 140 than is required to close switch 48. As a result simultaneous depression of actuator buttons 46 and 50 results first in contacts 138 and 140 closing, and then switch 48 closing so that motor 76, 78 is initially connected for low speed forward drive and then high speed forward drive.

In order to enable persons skilled in the art to better understand our invention we will now explain the operation of it. It will be assumed that our invention is embodied in a material handling vehicle of the type which requires that the operator walk along side of it and includes a control lever. Further, it will be assumed that the operator initially wishes to actuate the vehicle to operate in a forward direction at a low speed and then at a higher speed. The operator grasps one of handles 16 and moves the control lever 10 to a position which closes switch 86. When this occurs the circuit through solenoid coil 152 is completed with the result that coil 152 is energized and causes both pairs of contacts of switch 142 to close. Now, by manipulating levers 70 to pivot actuator 64 in a counter-clockwise direction the actuator buttons 46 and 50 are depressed. Depression of actuator buttons 46 and 50 initially causes contacts 134 and 136 of switch 44 to open and contacts 138 and 140 of switch 44 to close. Since contacts 148 and 150 are now closed because switch 142 is actuated and contacts 126 and 128 of reverse control switch 30 are closed, as this switch is unactuated, the circuit through solenoid coil 100 is completed, thereby energizing this coil. As a result forward motor switch 88 is actuated to connect motor 76, 78 in circuit for forward rotation. Further movement of actuator button 50 then causes switch 48 to close which completes the circuit through solenoid coil 124, thereby causing switch 122 to close with the result that resistor 120 is by-passed. As a result motor 76, 78 operates at a higher speed.

Assuming now that the operator has manipulated actuator 64 to connect motor 76, 78 for forward drive in either low or high speed and then becomes penned between the control lever 10 and a wall, the safety actuator 52 will be pushed so that it pivots in a clockwise direction causing actuator buttons 32 and 36 to be depressed. This is true even though the operator would maintain actuator 64 in the counter-clockwise pivoted position. Initial depression of actuator button by safety actuator 52 causes contacts 126 and 128 of reverse control switch 30 to open and contacts 130 and 132 of this switch to close. Opening of contacts 126 and 128 breaks the circuit through solenoid coil 100, thereby permitting switch 88 to return to the normal position shown in FIG. 4 so that motor 76, 78 is no longer connected for forward drive. At the same time closing of contacts 130 and 132 completes the circuit through solenoid coil 110 which actuates switch 90 to condition motor 76, 78 for reverse drive. So long as switch 34 is not yet closed motor 76, 78 will be connected for low speed reverse drive. Further depression of actuator button 36 then results in switch 34 closing which energizes solenoid coil 124 to close switch 122 which by-passes resistor 120, thus permitting motor 76, 78 to run at a higher speed.

Now after motor 76, 78 has been connected for reverse drive to propel the vehicle and control lever 10 away from the operator so that a force is no longer being applied to safety actuator 52, reverse control switch 30 and high speed switch 34 will return to their normal positions as shown in FIG. 4. Thus, the motor 76, 78 is no longer connected for reverse drive. Assuming, however, that the operator still is maintaining actuator 64 in the clockwise pivoted position to close contacts 138 and 140 of forward control switch 44, it will be noted that solenoid coil 152 is not energized due to the previous opening of contacts 126 and 128. Consequently, a circuit through solenoid coil 100 to actuate the forward motor switch 88 cannot be completed since contacts 148 and 150 of switch 142 are open. In order to again connect motor 76, 78 for forward drive it is necessary for the operator to permit actuator 64 to pivot back to the neutral position as shown in FIG. 1 so that contacts 134 and 136 of forward control switch 44 are closed at the same time as contacts 126 and 128 of reverse control switch 30 are closed so that solenoid 152 may be energized to close the contacts of switch 142.

While we have described only a single preferred embodiment of our invention hereinabove it will be understood that our invention is subject to various modifications, changes and the like which would occur to persons skilled in the art and still be within the spirit and scope of our invention. Consequently, the foregoing description is intended to be illustrative only and the limits of our invention should be determined from the following appended claims.

We claim:

1. For use with a vehicle having a reversible electric motor, the combination comprising a control lever, the said control lever including a body, a forward motor control switch mounted on the said body, the said forward switch including a pair of normally closed contacts and a pair of normally open contacts and being actuatable to reverse the condition of the contacts thereof, a reverse motor control switch mounted on the said body, the said reverse switch including a pair of normally closed contacts and a pair of normally open contacts and being actuable to reverse the condition of the contacts thereof, a manually operable actuator mounted on the said body and operable to actuate selectively either the said forward or reverse switches, a safety actuator mounted on the said body and operable to actuate the said reverse switch only, and a motor control circuit having a forward motor circuit including the said normally open forward switch contacts and the said normally closed reverse switch contacts, a reverse motor circuit including the said normally open reverse switch contacts, and a solenoid actuated switch including first and second pairs of normally open contacts, the said first pair of contacts forming a part of the said forward motor circuit and the said second pair of contacts and the said normally closed forward and reverse switch contacts being connected in circuit so that the said solenoid can be energized initially only when the said normally closed forward and reverse switch contacts are closed.

2. For use with a reversible electric motor, a motor control circuit comprising a forward motor operating circuit, a motor reversing circuit, a forward control switch including a pair of normally open contacts in the said forward circuit and a pair of normally closed contacts, a reverse control switch including a pair of normally open contacts in the said reverse circuit and a pair of normally closed contacts in the said forward circuit in series with both pairs of forward control switch contacts, and a sequence switch including a first pair of normally open contacts in the said forward circuit and a second pair of normally open contacts, a solenoid connected to the said sequence switch and operable when energized to close the said sequence switch contacts, the said solenoid being connected in circuit with the said normally closed forward control switch contacts, the said normally closed reverse control switch contacts and the said second pair of normally open contacts which are in parallel with the said normally closed contacts of the said forward control switch so that the said solenoid can be energized initially only when the said normally closed contacts of the said forward and reverse control switches are closed.

3. For use with an electric motor and a power source, a motor control circuit comprising a forward motor switch actuatable to a position connecting the motor across the power source for operation in a forward direction of rotation, a reverse motor switch actuatable to a position connecting the motor across the power source for operation in a reverse direction of rotation, a forward solenoid connected to the said forward motor switch and operable when energized to actuate the said forward motor switch to connect the motor across the power source for forward rotation, a reverse solenoid connected to the said reverse motor switch and operable when energized to actuate the said reverse motor switch to connect the motor across the power source for reverse rotation, a sequence switch having first and second pairs of normally open contacts, the said sequence switch being actuatable to a position wherein the said pairs of contacts are closed, a solenoid connected to the said sequence switch and operable when energized to actuate the said sequence switch to close the said pairs of normally open contacts, a forward control switch having a pair of normally closed contacts and a pair of normally open contacts and operable when actuated to open the pair of normally closed contacts and close the pair of normally open contacts, and a reverse control switch having a pair of normally closed contacts and a pair of normally open contacts and operable when actuated to open the pair of normally closed contacts and close the pair of normally open contacts, the said reverse solenoid and the said normally open reverse control switch contacts being connected in series across the power source, the said forward solenoid, second pair of normally open contacts, normally open forward control switch contacts and normally closed reverse control switch contacts being connected in series across the power source, the said normally closed forward control switch contacts and the said first pair of normally open contacts being connected in parallel with each other and in series across the power source with the said normally closed reverse control switch contacts and the said sequence switch solenoid.

References Cited

UNITED STATES PATENTS 2,893,448    7/1959    Elworthy _____ 318—548

ORIS L. RADER, *Primary Examiner.*

K. L. CROSSON, *Assistant Examiner.*